United States Patent [19]

Takase

[11] Patent Number: 4,913,537

[45] Date of Patent: Apr. 3, 1990

[54] VARI-FOCAL LENS SYSTEM WITH SWITCHABLE AUXILIARY LENS UNITS

[75] Inventor: Hiroshi Takase, Tokyo, Japan

[73] Assignee: Olympus Optical Co., Ltd., Tokyo, Japan

[21] Appl. No.: 267,845

[22] Filed: Nov. 7, 1988

[30] Foreign Application Priority Data

Nov. 10, 1987 [JP] Japan .................. 62-282154

[51] Int. Cl.$^4$ .............................. G02B 15/02
[52] U.S. Cl. ................... 350/422; 350/254
[58] Field of Search ........ 350/422, 254, 474

[56] References Cited

U.S. PATENT DOCUMENTS 3,817,599 5/1989 McCrobie .................. 350/422

FOREIGN PATENT DOCUMENTS 62-177513 8/1987 Japan .
62-206514 9/1987 Japan .

Primary Examiner—P. M. Dzierzynski
Attorney, Agent, or Firm—Cushman, Darby & Cushman

[57] ABSTRACT

A vari-focal lens system with switchable auxiliary lens units comprising a master lens system, an auxiliary lens unit removably arranged after the master lens system and another auxiliary lens unit removably arranged after said auxiliary lens unit, said vari-focal lens system being so adapted as to permit photographing at multiple different focal lengths by speedy switching operation with a simple mechanism.

3 Claims, 7 Drawing Sheets

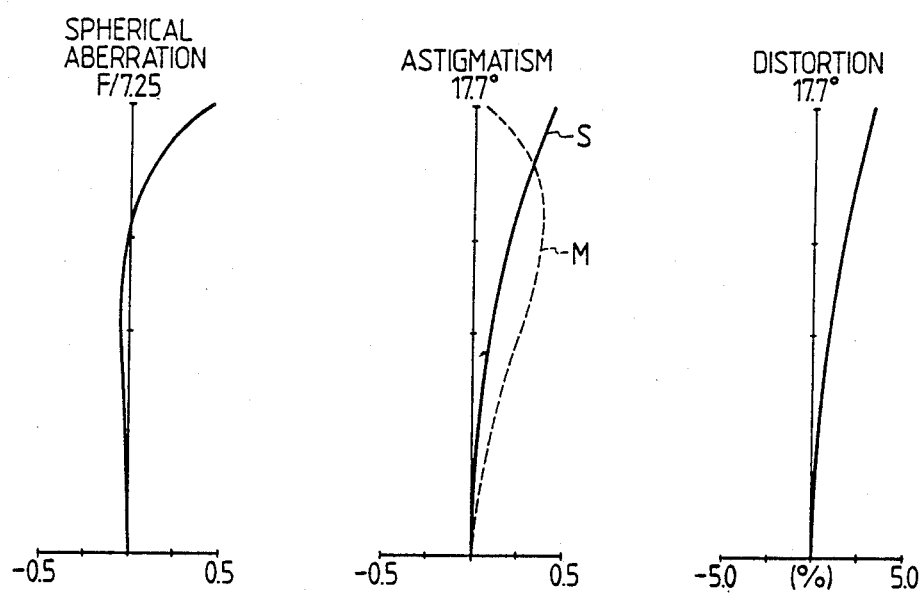
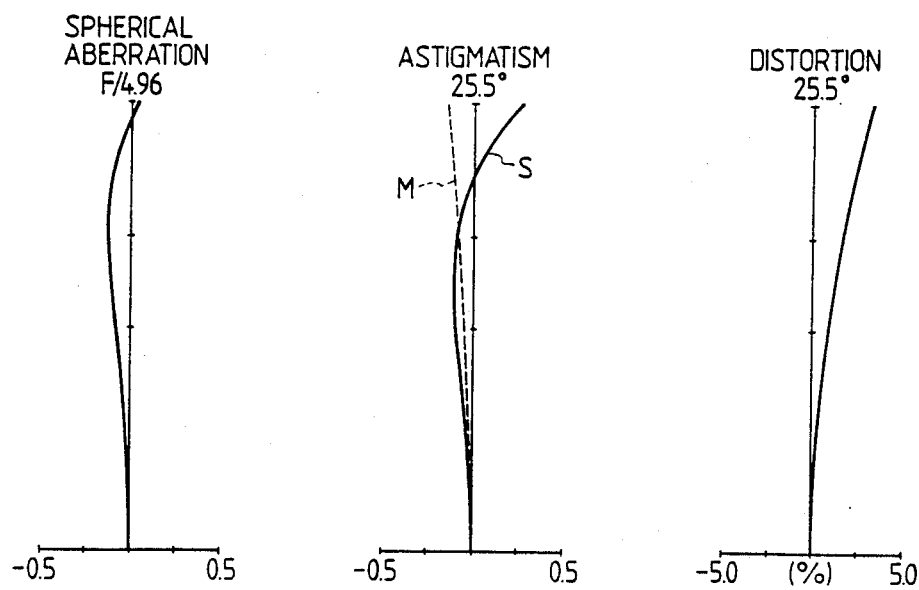

VARI-FOCAL LENS SYSTEM WITH SWITCHABLE AUXILIARY LENS UNITS

BACKGROUND OF THE INVENTION (a) Field of the Invention

The present invention relates to a vari-focal lens system usable in multiple focal length conditions and to be used in photographic lens systems, video camera lens systems, electronic still camera lens systems, etc.

(b) Description of the Prior Art

As the conventional examples of lens systems easily usable in multiple focal length conditions in photographic lens systems, etc., there are already known the lens systems disclosed by Japanese Unexamined Published Patent Application No. 206514/62 and Japanese Unexamined Published Patent Application No. 177513/62.

Each of these lens systems is so adapted as to change focal length thereof by inserting one of two auxiliary lens units different from each other after a master lens system. Especially, the lens system disclosed by the former patent Application is so designed as to permit using only the master lens system in a focal length condition and is usable in three focal length conditions. Since these conventional lens systems are so designed as to require removing out of the optical axis the auxiliary lens unit already attached to the master lens system before inserting the other auxiliary lens unit, these lens systems require rather long time for switching the auxiliary lens units and have a fear to miss good shutter operating timing. If an attempt is made to overlap the removing time with the inserting time of the auxiliary lens units for correcting the defect described above, it is necessary to use a means for preventing both the lens units from hindering movements by each other, thereby posing restrictions on spatial arrangement and movement courses of the auxiliary lens units as well as the mechanism for driving the auxiliary lens units. As a result, other defects will be produced to lose compactness, increase weight and enhance manufacturing costs of the vari-focal lens systems.

Further, the conventional vari-focal lens systems require an auxiliary lens unit for each focal length condition. When the number of the focal length conditions is increased, the refuge spaces and switching mechanisms for the auxiliary lens units are increased, thereby enlarging the lens systems, increasing weights, enhancing manufacturing costs thereof, and finally making it substantially difficult to obtain four or more focal length conditions.

Furthermore, in a case where an attempt is made to obtain a shorter focal length condition by attaching an auxiliary lens unit to a master lens system, a total length of a vari-focal lens system will be prolonged as compared with a case where the focal length condition is obtained with an independent lens system. Moreover, when a focal length which is the same as the above-mentioned focal length condition is obtained by attaching, for prolonging focal length, an auxiliary lens unit to a master lens system having a focal length shorter than that of the above-mentioned master lens system, the former master lens system proper has a longer length as measured from the foremost surface of the lens system to the film surface and, therefore, it is difficult to shorten the total length of the vari-focal lens system.

SUMMARY OF THE INVENTION

A primary object of the present invention is to provide a vari-focal lens system comprising a master lens system, a first auxiliary lens unit removably arranged after the master lens system and a second auxiliary lens unit removably arranged after the first auxiliary lens unit. Accordingly, the vari-focal lens system according to the present invention is so adapted as to be capable of changing focal length by inserting the first auxiliary lens unit and further changing focal length by inserting the second auxiliary lens unit. Speaking more concretely, the vari-focal lens system according to the present invention permits photographing with the master lens system alone, photographing in a focal length condition different from that of the master lens system alone with a lens system wherein the first auxiliary lens unit is arranged after the master lens system, and photographing with a lens system wherein the second auxiliary lens unit is further arranged after the first auxiliary lens unit in a focal length condition which is different from either of the focal length condition with the master lens system alone or the focal length condition with the lens system wherein the first auxiliary lens unit is arranged after the master lens unit.

Further, the vari-focal lens system according to the present invention permits photographing in a focal length conditions different from the focal length condition of the lens system established as a combination of the master lens system and the first auxiliary lens unit by arranging a second auxiliary lens unit different from the first auxiliary lens unit after the master lens system. In this case, the vari-focal lens system permits photographing in two focal length conditions by replacing the first auxiliary lens unit with the second auxiliary lens unit and in an additional focal length condition different from each of the above-mentioned focal length conditions with the first auxiliary lens unit arranged after the master lens system and the second auxiliary lens unit arranged after the first auxiliary lens unit. This second auxiliary lens unit makes it possible to use the vari-focal lens system according to the present invention for photographing in a larger number of focal length conditions.

Since the vari-focal lens system according to the present invention is so designed as to change focal length by inserting the auxiliary lens units after the auxiliary lens unit, it is capable of performing auxiliary lens unit switching operations independently of each other, changing focal length stepwise and switching focal length at a time from the shortest condition to the longest condition with no time lag.

Photographing is possible in a number of focal length conditions larger than that of the auxiliary lens units by using the vari-focal lens system with a combination of the auxiliary lens units arranged after the master lens system in addition to the above-described use where each of the auxiliary lens unit is arranged independently after the master lens system. In this case, it is preferable for lessening degradation of image quality that each of the auxiliary lens unit has a magnification similar to that of the master lens system alone.

When the vari-focal lens system is to be used in two modes for photographing, i.e., one with the first auxiliary lens unit arranged after the master lens system and the other with both the first and second lens units arranged after the master lens system, it is desirable that the first auxiliary lens unit and the second auxiliary lens unit are designed for the same specifications for the reasons described below:

(a) The same specifications for both the auxiliary lens units are effective to enhance production efficiency and reduce manufacturing cost.

(b) Since vari-focal ratio at each step is small, composition of the auxiliary lens units can be simplified and a vari-focal lens systems having higher performance can be obtained with a smaller number of lens elements than the total number of lens elements required for composing plural lens systems having focal lengths equal to the respective focal length conditions. Accordingly, the same specifications for the auxiliary lens units make it possible to further reduce manufacturing cost and lessen weight of the vari-focal lens system.

Moreover, it is possible to minimize telephoto ratio of the vari-focal lens system by designing the auxiliary lens units as diverging lens units. When the diverging lens units are arranged step by step, the rear section of the vari-focal lens system has relatively stronger diverging refractive power and telephoto ratio of the vari-focal lens system is further minimized, thereby making it possible to compose a compacter cameras.

BRIEF DESCRIPTION OF THE DRAWINGS

FIG. 5 and FIG. 6 show curves illustrating aberration characteristics of the Embodiment 1 of the present invention;

FIG. 7 and FIG. 8 show curves illustrating aberration characteristics of the Embodiment 2 of the present invention.

DETAILED DESCRIPTION OF THE PREFERRED EMBODIMENTS

Now, the preferred embodiments of the vari-focal lens system according to the present invention will be detailedly described with reference to the accompanying drawings.

Figure 1A:
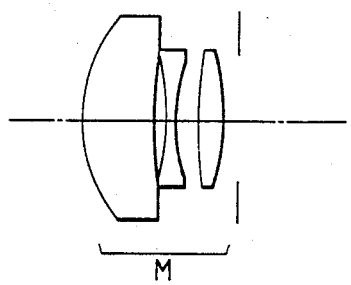
FIG. 1A, FIG. 1B and FIG. 1C show sectional views illustrating Embodiment 1 of the vari-focal lens system according to the present invention.
Figure 1B:
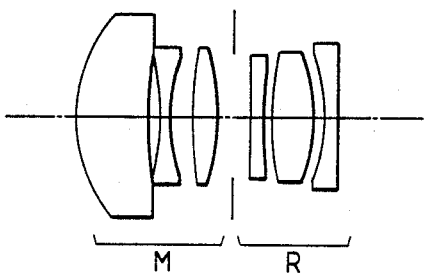
Figure 1C:
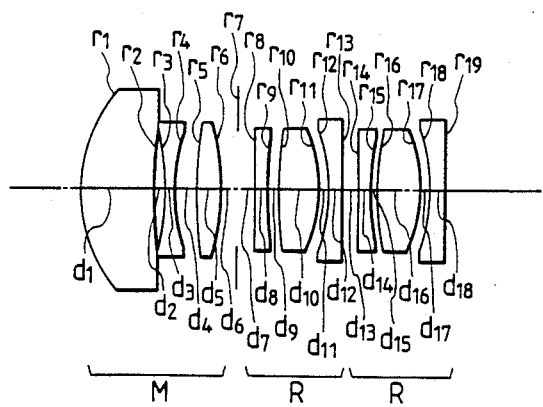

FIGS. 1A, FIG. 1B and FIG. 1C show composition of the Embodiment 1 of the vari-focal lens system according to the present invention. Out of these drawings, FIG. 1 illustrates the master lens system M.

FIG. 1B shows a lens system wherein a first auxiliary lens unit R is added after the master lens system M to obtain a focal length condition which is different from the focal length of the master lens system M. FIG. 1C shows a lens system wherein a second auxiliary lens unit R which is quite the same as the first auxiliary lens unit is further arranged after the master lens system M and the first auxiliary lens unit R. By composing the lens system shown in FIG. 1C, it is possible to obtain a focal length condition which is different from the focal length condition of the master lens system alone or the focal length condition of the lens system composed of the master lens system and the first auxiliary lens unit.

Figure 2A:
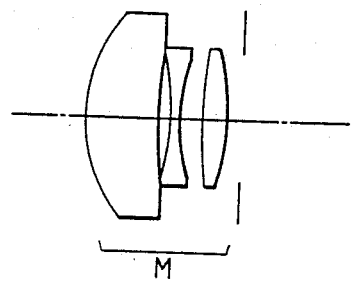
FIG. 2A, FIG. 2B and FIG. 2C show sectional views illustrating Embodiment 2 of the vari-focal lens system according to the present invention.
Figure 2B:
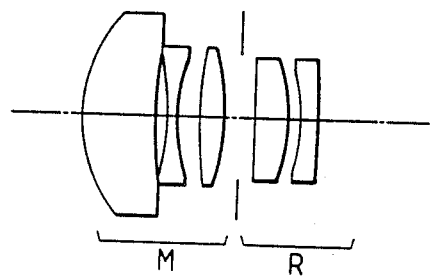
Figure 2C:
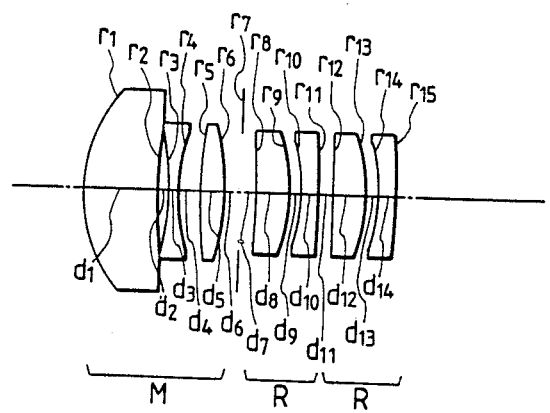

FIG. 2A, FIG. 2B and FIG. 2C show the Embodiment 2 of the present invention. In the Embodiment 2, auxiliary lens units R which is different from those used in the Embodiment 1 are added to the master lens system which is the same as that adopted in the Embodiment 1. Speaking more concretely, FIG. 2B shows a lens system wherein a first auxiliary lens unit R is added after the master lens system M. Further, FIG. 2C shows a lens system wherein a second auxiliary lens unit R which is the same as the first auxiliary lens unit is added to the composition shown in FIG. 2B. The lens systems illustrated in FIG. 2A, FIG. 2B and FIG. 2C have the focal lengths conditions different from one another.

Figure 3A:
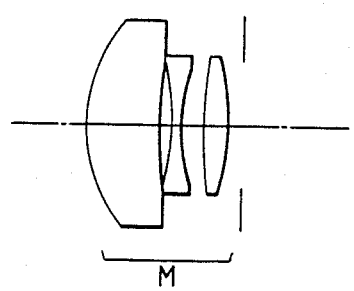
FIG. 3A, FIG. 3B, FIG. 3C and FIG. 3D show sectional views illustrating Embodiment 3 of the vari-focal lens system according to the present invention.
Figure 3D:
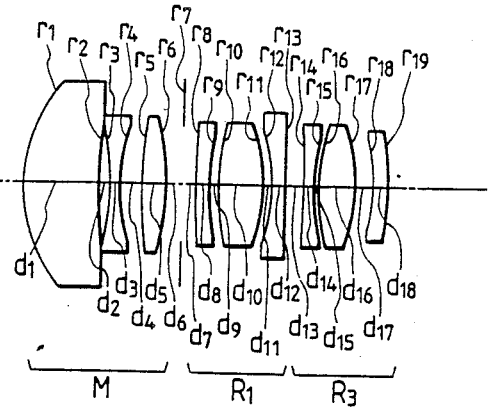
Figure 3B:
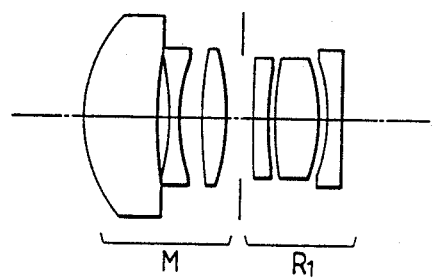
Figure 3C:
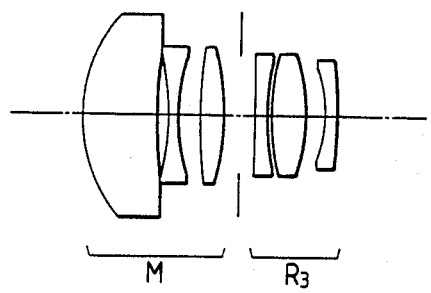

FIG. 3A, FIG. 3B and FIG. 3C illustrates the Embodiment 3 of the present invention. In the Embodiment 3, a first auxiliary lens unit $R_1$ is added, for obtaining the composition shown in FIG. 3B, to the master lens system M which is same as that used in the Embodiment 1 or the Embodiment 2. Further, a second auxiliary lens unit $R_3$ which is different from the first auxiliary lens unit is added after the master lens system M to obtain the composition shown in FIG. 3C. Furthermore, the second auxiliary lens unit $R_3$ used in FIG. 3C is added to the master lens system M plus the first auxiliary lens unit $R_1$ to obtain the lens composition shown in FIG. 3D. The lens systems shown in FIG. 3A, FIG. 3B, FIG. 3C and FIG. 3D have focal length conditions which are different from one another. The Embodiment 1, 2 and 3 described above have the numerical data shown below:

| Embodiment 1 |
| --- |
| (A) Master lens system + first auxiliary lens unit<br>$f = 46.7$, $F/5.0$, $2\omega = 49.7°$ |

| | | | |
| --- | --- | --- | --- |
| $r_1 = 10.6000$ | | | |
| | $d_1 = 4.6100$ | $n_1 = 1.73400$ | $\nu_1 = 51.49$ |
| $r_2 = 27.7050$ | | | |
| | $d_2 = 0.5900$ | | |
| $r_3 = -35.2920$ | | | |
| | $d_3 = 0.8000$ | $n_2 = 1.68893$ | $\nu_2 = 31.08$ |
| $r_4 = 11.2770$ | | | |
| | $d_4 = 1.5400$ | | |
| $r_5 = 41.7410$ | | | |
| | $d_5 = 1.3000$ | $n_3 = 1.79952$ | $\nu_3 = 42.24$ |
| $r_6 = -21.7810$ | | | |
| | $d_6 = 1.0900$ | | |
| $r_7 = \infty$ (stop) | | | |
| | $d_7 = 1.0000$ | | |
| $r_8 = 249.8573$ | | | |
| | $d_8 = 0.9182$ | $n_4 = 1.79952$ | $\nu_4 = 42.24$ |
| $r_9 = 31.0611$ | | | |
| | $d_9 = 0.4591$ | | |
| $r_{10} = 23.1691$ | | | |
| | $d_{10} = 2.7546$ | $n_5 = 1.59551$ | $\nu_5 = 39.21$ |
| $r_{11} = -11.9441$ | | | |
| | $d_{11} = 0.5509$ | | |
| $r_{12} = -11.3637$ | | | |
| | $d_{12} = 0.9182$ | $n_6 = 1.78590$ | $\nu_6 = 44.18$ |
| $r_{13} = \infty$ | | | |

| (B) Master lens system + first auxiliary lens unit<br>+ second auxiliary lens unit<br>$f = 67.6$, $F/7.26$, $2\omega = 35.5°$ |
| --- |

| | | | |
| --- | --- | --- | --- |
| $r_1 = 10.6000$ | | | |
| | $d_1 = 4.6100$ | $n_1 = 1.73400$ | $\nu_1 = 51.49$ |
| $r_2 = 27.7050$ | | | |
| | $d_2 = 0.5900$ | | |
| $r_3 = -35.2920$ | | | |
| | $d_3 = 0.8000$ | $n_2 = 1.68893$ | $\nu_2 = 31.08$ |
| $r_4 = 11.2770$ | | | |
| | $d_4 = 1.5400$ | | |
| $r_5 = 41.7410$ | | | |
| | $d_5 = 1.3000$ | $n_3 = 1.79952$ | $\nu_3 = 42.24$ |

-continued

Embodiment 1

| | | | |
|---|---|---|---|
| $r_6 = -21.7810$ | | | |
| | $d_6 = 1.0900$ | | |
| $r_7 = \infty$ (stop) | | | |
| | $d_7 = 1.0000$ | | |
| $r_8 = 249.8573$ | | | |
| | $d_8 = 0.9182$ | $n_4 = 1.79952$ | $\nu_4 = 42.24$ |
| $r_9 = 31.0611$ | | | |
| | $d_9 = 0.4591$ | | |
| $r_{10} = 23.1691$ | | | |
| | $d_{10} = 2.7546$ | $n_5 = 1.59551$ | $\nu_5 = 39.21$ |
| $r_{11} = -11.9441$ | | | |
| | $d_{11} = 0.5509$ | | |
| $r_{12} = -11.3637$ | | | |
| | $d_{12} = 0.9182$ | $n_6 = 1.78590$ | $\nu_6 = 44.18$ |
| $r_{13} = \infty$ | | | |
| | $d_{13} = 1.0000$ | | |
| $r_{14} = 249.8573$ | | | |
| | $d_{14} = 0.9182$ | $n_7 = 1.79952$ | $\nu_7 = 42.24$ |
| $r_{15} = 31.0611$ | | | |
| | $d_{15} = 0.4591$ | | |
| $r_{16} = 23.1691$ | | | |
| | $d_{16} = 2.7546$ | $n_8 = 1.59551$ | $\nu_8 = 39.21$ |
| $r_{17} = -11.9441$ | | | |
| | $d_{17} = 0.5509$ | | |
| $r_{18} = -11.3637$ | | | |
| | $d_{18} = 0.9182$ | $n_9 = 1.78590$ | $\nu_9 = 44.18$ |
| $r_{19} = \infty$ | | | |

Embodiment 2

(A) Master lens system + first auxiliary lens unit
$f = 46.2, F/4.96, 2\omega = 50.1°$

| | | | |
|---|---|---|---|
| $r_1 = 10.6000$ | | | |
| | $d_1 = 4.6100$ | $n_1 = 1.73400$ | $\nu_1 = 51.49$ |
| $r_2 = 27.7050$ | | | |
| | $d_2 = 0.5900$ | | |
| $r_3 = -35.2920$ | | | |
| | $d_3 = 0.8000$ | $n_2 = 1.68893$ | $\nu_2 = 31.08$ |
| $r_4 = 11.2770$ | | | |
| | $d_4 = 1.5400$ | | |
| $r_5 = 41.7410$ | | | |
| | $d_5 = 1.3000$ | $n_3 = 1.79952$ | $\nu_3 = 42.24$ |
| $r_6 = -21.7810$ | | | |
| | $d_6 = 1.0900$ | | |
| $r_7 = \infty$ (stop) | | | |
| | $d_7 = 1.0000$ | | |
| $r_8 = -136.4823$ | | | |
| | $d_8 = 2.0476$ | $n_4 = 1.59270$ | $\nu_4 = 35.29$ |
| $r_9 = -13.9693$ | | | |
| | $d_9 = 0.8096$ | | |
| $r_{10} = -13.1401$ | | | |
| | $d_{10} = 1.0238$ | $n_5 = 1.83481$ | $\nu_5 = 42.72$ |
| $r_{11} = -74.5892$ | | | |

(B) Master lens system + first auxiliary lens unit
+ second auxiliary lens unit
$f = 67.5, F/7.25, 2\omega = 35.5°$

| | | | |
|---|---|---|---|
| $r_1 = 10.6000$ | | | |
| | $d_1 = 4.6100$ | $n_1 = 1.73400$ | $\nu_1 = 51.49$ |
| $r_2 = 27.7050$ | | | |
| | $d_2 = 0.5900$ | | |
| $r_3 = -35.2920$ | | | |
| | $d_3 = 0.8000$ | $n_2 = 1.68893$ | $\nu_2 = 31.08$ |
| $r_4 = 11.2770$ | | | |
| | $d_4 = 1.5400$ | | |
| $r_5 = 41.7410$ | | | |
| | $d_5 = 1.3000$ | $n_3 = 1.79952$ | $\nu_3 = 42.24$ |
| $r_6 = -21.7810$ | | | |
| | $d_6 = 1.0900$ | | |
| $r_7 = \infty$ (stop) | | | |
| | $d_7 = 1.0000$ | | |
| $r_8 = -136.4823$ | | | |
| | $d_8 = 2.0476$ | $n_4 = 1.59270$ | $\nu_4 = 35.29$ |
| $r_9 = -13.9693$ | | | |
| | $d_9 = 0.8096$ | | |
| $r_{10} = -13.1401$ | | | |
| | $d_{10} = 1.0238$ | $n_5 = 1.83481$ | $\nu_5 = 42.72$ |
| $r_{11} = -74.5892$ | | | |

-continued

Embodiment 2

| | | | |
|---|---|---|---|
| | $d_{11} = 1.0000$ | | |
| $r_{12} = -136.4823$ | | | |
| | $d_{12} = 2.0476$ | $n_6 = 1.59270$ | $\nu_6 = 35.29$ |
| $r_{13} = -13.9693$ | | | |
| | $d_{13} = 0.8096$ | | |
| $r_{14} = -13.1401$ | | | |
| | $d_{14} = 1.0238$ | $n_7 = 1.83481$ | $\nu_7 = 42.72$ |
| $r_{15} = -74.5892$ | | | |

Embodiment 3

(A) Master lens system + first auxiliary lens unit
$f = 46.0, F/4.94, 2\omega = 50.3°$

| | | | |
|---|---|---|---|
| $r_1 = 10.6000$ | | | |
| | $d_1 = 4.6100$ | $n_1 = 1.73400$ | $\nu_1 = 51.49$ |
| $r_2 = 27.7050$ | | | |
| | $d_2 = 0.5900$ | | |
| $r_3 = -35.2920$ | | | |
| | $d_3 = 0.8000$ | $n_2 = 1.68893$ | $\nu_2 = 31.08$ |
| $r_4 = 11.2770$ | | | |
| | $d_4 = 1.5400$ | | |
| $r_5 = 41.7410$ | | | |
| | $d_5 = 1.3000$ | $n_3 = 1.79952$ | $\nu_3 = 42.24$ |
| $r_6 = -21.7810$ | | | |
| | $d_6 = 1.0900$ | | |
| $r_7 = \infty$ (stop) | | | |
| | $d_7 = 1.0000$ | | |
| $r_8 = 274.4312$ | | | |
| | $d_8 = 0.9463$ | $n_4 = 1.79952$ | $\nu_4 = 42.24$ |
| $r_9 = 31.2261$ | | | |
| | $d_9 = 0.4918$ | | |
| $r_{10} = 23.6553$ | | | |
| | $d_{10} = 2.8390$ | $n_5 = 1.59551$ | $\nu_5 = 39.21$ |
| $r_{11} = -12.1674$ | | | |
| | $d_{11} = 0.5660$ | | |
| $r_{12} = -11.5072$ | | | |
| | $d_{12} = 0.9463$ | $n_6 = 1.78590$ | $\nu_6 = 44.18$ |
| $r_{13} = -586.2819$ | | | |

(B) Master lens system + third auxiliary lens unit
$f = 62.1, F/6.67, 2\omega = 38.4°$

| | | | |
|---|---|---|---|
| $r_1 = 10.6000$ | | | |
| | $d_1 = 4.6100$ | $n_1 = 1.73400$ | $\nu_1 = 51.49$ |
| $r_2 = 27.7050$ | | | |
| | $d_2 = 0.5900$ | | |
| $r_3 = -35.2920$ | | | |
| | $d_3 = 0.8000$ | $n_2 = 1.68893$ | $\nu_2 = 31.08$ |
| $r_4 = 11.2770$ | | | |
| | $d_4 = 1.5400$ | | |
| $r_5 = 41.7410$ | | | |
| | $d_5 = 1.3000$ | $n_3 = 1.79952$ | $\nu_3 = 42.24$ |
| $r_6 = -21.7810$ | | | |
| | $d_6 = 1.0900$ | | |
| $r_7 = \infty$ (stop) | | | |
| | $d_7 = 1.0000$ | | |
| $r_8 = -121.7253$ | | | |
| | $d_8 = 0.8092$ | $n_4 = 1.83400$ | $\nu_4 = 37.16$ |
| $r_9 = 16.6085$ | | | |
| | $d_9 = 0.2268$ | | |
| $r_{10} = 13.8462$ | | | |
| | $d_{10} = 2.3266$ | $n_5 = 1.59270$ | $\nu_5 = 35.29$ |
| $r_{11} = -11.7545$ | | | |
| | $d_{11} = 1.1943$ | | |
| $r_{12} = -10.2069$ | | | |
| | $d_{12} = 0.8092$ | $n_6 = 1.83481$ | $\nu_6 = 42.72$ |
| $r_{13} = -39.1844$ | | | |

(C) Master lens system + first auxiliary lens unit
+ third auxiliary lens unit
$f = 91.6, F/9.84, 2\omega = 26.5°$

| | | | |
|---|---|---|---|
| $r_1 = 10.6000$ | | | |
| | $d_1 = 4.6100$ | $n_1 = 1.73400$ | $\nu_1 = 51.49$ |
| $r_2 = 27.7050$ | | | |
| | $d_2 = 0.5900$ | | |
| $r_3 = -35.2920$ | | | |
| | $d_3 = 0.8000$ | $n_2 = 1.68893$ | $\nu_2 = 31.08$ |
| $r_4 = 11.2770$ | | | |
| | $d_4 = 1.5400$ | | |

-continued

Embodiment 3

| | | | |
|---|---|---|---|
| $r_5 = 41.7410$ | | | |
| | $d_5 = 1.3000$ | $n_3 = 1.79952$ | $v_3 = 42.24$ |
| $r_6 = -21.7810$ | | | |
| | $d_6 = 1.0900$ | | |
| $r_7 = \infty$ (stop) | | | |
| | $d_7 = 1.000$ | | |
| $r_8 = 274.4312$ | | | |
| | $d_8 = 0.9463$ | $n_4 = 1.79952$ | $v_4 = 42.24$ |
| $r_9 = 31.2261$ | | | |
| | $d_9 = 0.4918$ | | |
| $r_{10} = 23.6553$ | | | |
| | $d_{10} = 2.8390$ | $n_5 = 1.59551$ | $v_5 = 39.21$ |
| $r_{11} = -12.1674$ | | | |
| | $d_{11} = 0.5660$ | | |
| $r_{12} = -11.5072$ | | | |
| | $d_{12} = 0.9463$ | $n_6 = 1.78590$ | $v_6 = 44.18$ |
| $r_{13} = -586.2819$ | | | |
| | $d_{13} = 1.0000$ | | |
| $r_{14} = -121.7253$ | | | |
| | $d_{14} = 0.8092$ | $n_7 = 1.83400$ | $v_7 = 37.16$ |
| $r_{15} = 16.6085$ | | | |
| | $d_{15} = 0.2268$ | | |
| $r_{16} = 13.8462$ | | | |
| | $d_{16} = 2.3266$ | $n_8 = 1.59270$ | $v_8 = 35.29$ |
| $r_{17} = -11.7545$ | | | |
| | $d_{17} = 1.1943$ | | |
| $r_{18} = -10.2069$ | | | |
| | $d_{18} = 0.8092$ | $n_9 = 1.83481$ | $v_9 = 42.72$ |
| $r_{19} = -39.1844$ | | | | wherein the reference symbols $r_1, r_2, \ldots$ represent radii of curvature on the surface of the respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $v_1, v_2, \ldots$ represent Abbe's numbers of the respective lens elements. These Embodiments use the same master lens system ($r_1$ through $r_7$, $d_1$ through $d_6$, $n_1$ through $n_3$ and $v_1$ through $v_3$) M whose focal length, aperture ratio and field angle are $f=33.9$, $F/3.64$ and $2\omega=65°$ respectively.

Figure 4:
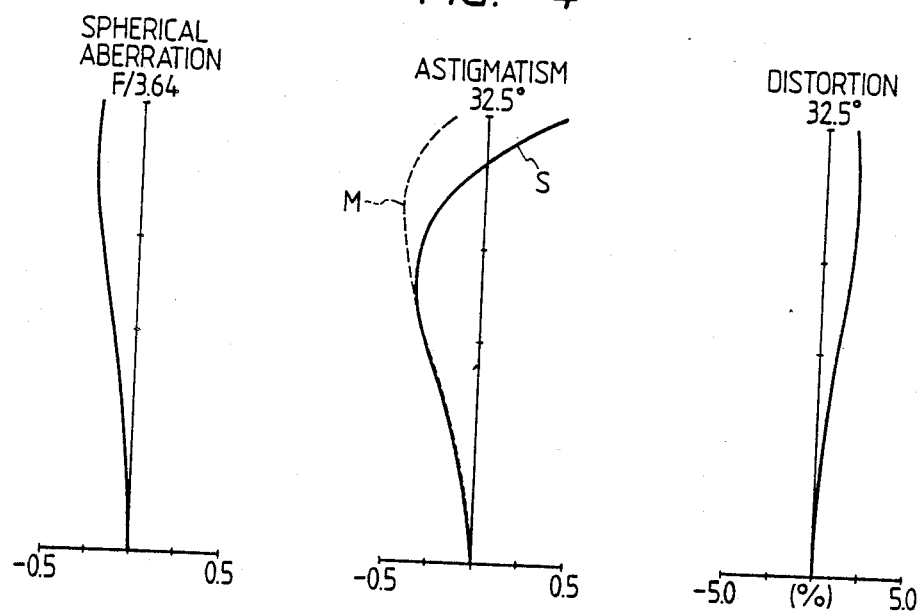
FIG. 4 shows curves illustrating aberration characteristics of the master lens system used in all the Embodiments of the present invention.
Figure 5:
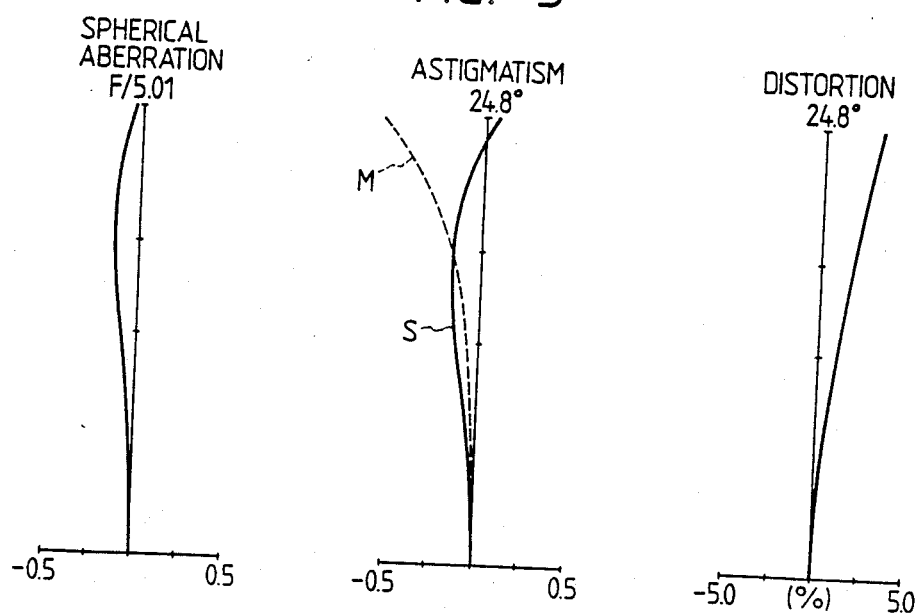
Figure 8:
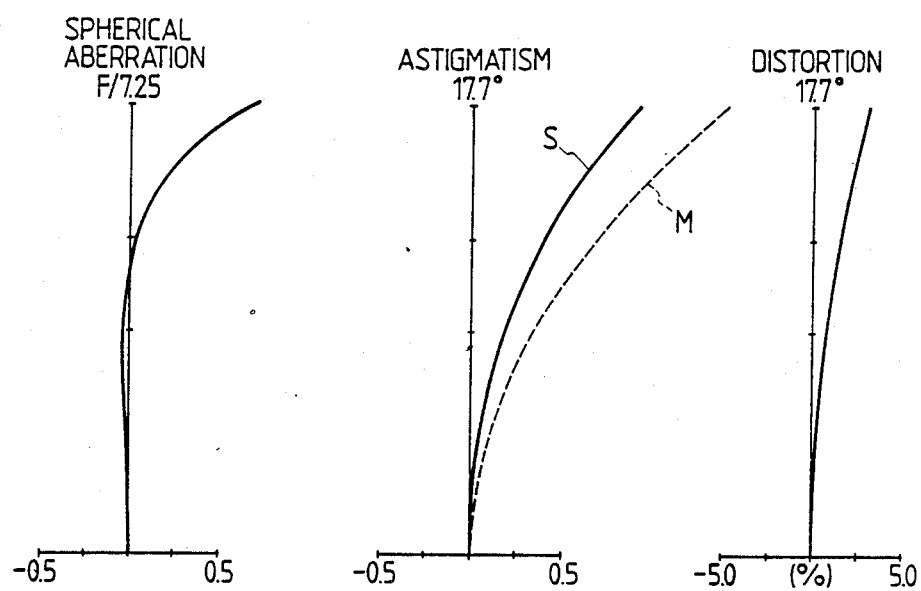
Figure 9:
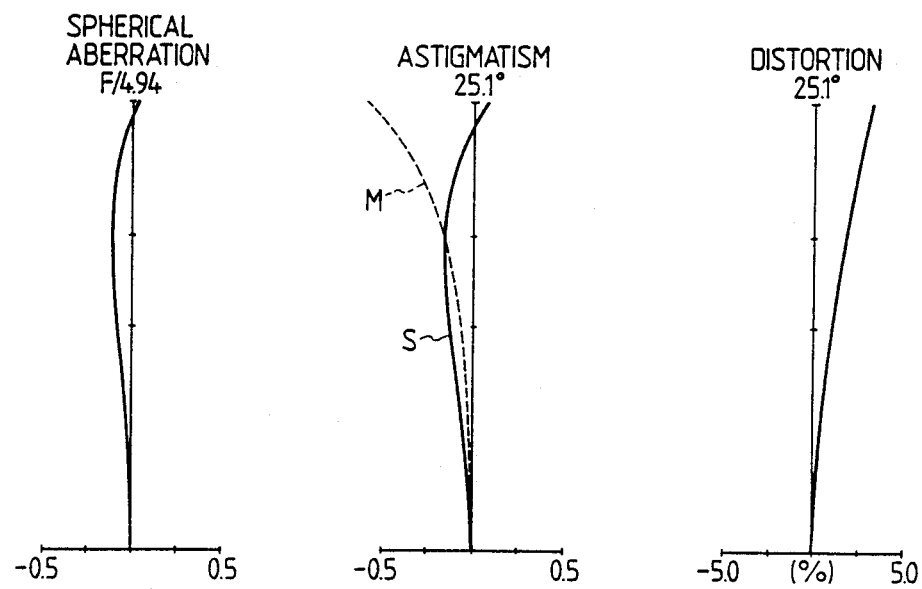
FIG. 9, FIG. 10 and FIG. 11 show curves illustrating aberration characteristics of the Embodiment 3 of the present invention.
Figure 10:
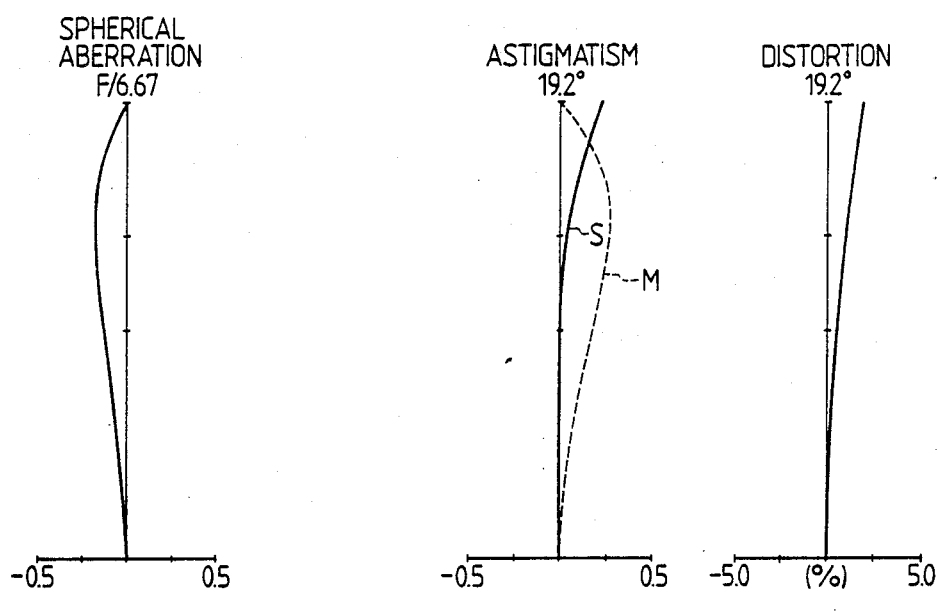
Figure 11:
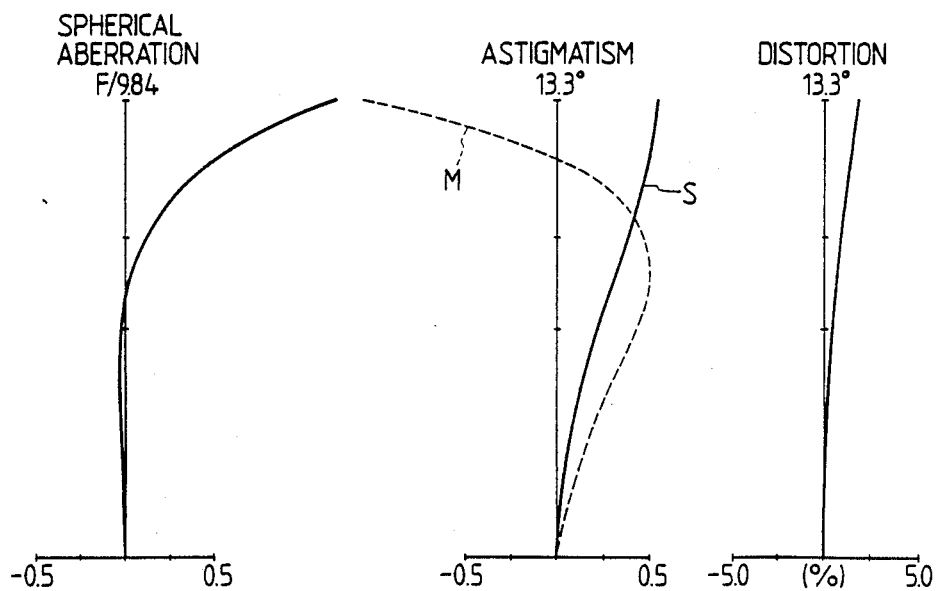

Aberration characteristics of the master lens system M used in these Embodiments are shown in FIG. 4. Aberration characteristics of the lens system shown in FIG. 1B of the Embodiment 1 are illustrated in FIG. 5, and those of the lens system shown in FIG. 1C are illustrated in FIG. 6. Aberration characteristics of the lens systems shown in FIG. 2B and FIG. 2C of the Embodiment 2 are illustrated in FIG. 7 and FIG. 8 respectively. Further, aberration characteristics of the lens systems shown in FIG. 3B, FIG. 3C and FIG. 3D of the Embodiment 3 are illustrated in FIG. 9, FIG. 10 and FIG. 11 respectively.

The vari-focal lens system with switchable auxiliary lens units according to the present invention is so adapted as to change focal length thereof by arranging an auxiliary lens unit after the master lens system and further arranging another auxiliary lens unit after said auxiliary lens unit, and permits speedy change of focal length condition with a very short time lag. Further, the vari-focal lens system permits obtaining focal length conditions in a number larger than the number of the auxiliary lens units used. Furthermore, it is possible to enhance production efficiency and reduce manufacturing cost of the vari-focal lens system by using a plural number of auxiliary lens units having the same numerical data.

I claim:

1. A vari-focal lens system with switchable auxiliary lens units comprising a master lens system, a first auxiliary lens unit insertably and removably arranged after said master lens system and a second auxiliary lens unit insertably and removably arranged after said first auxiliary lens unit, said vari-focal lens system being so adapted as to permit photographing at different focal lengths with the master lens system alone, with the master lens system plus the first auxiliary lens unit, and with the master lens system plus the first auxiliary lens unit plus the second auxiliary lens unit.

2. A vari-focal lens system with switchable auxiliary lens units according to claim 1 wherein the first auxiliary lens unit and the second auxiliary lens unit are designed for the same specifications.

3. A vari-focal lens system comprising a master lens system, a first auxiliary lens unit insertably and removably arranged after the master lens system and a second auxiliary lens unit insertably and removably arranged after the master lens system, said vari-focal lens system being so adapted as to permit photographing at different focal lengths with the master lens system alone, with the master lens system plus the first auxiliary lens unit, with the master lens system plus the second auxiliary lens unit, and with the master lens system plus the first auxiliary lens unit plus the second auxiliary lens unit.

* * * * *